United States Patent Office 3,623,865
Patented Nov. 30, 1971

3,623,865
PROCESSES FOR PRODUCING PHOTOGRAPHIC IMAGES UTILIZING LEUCOPHTHALOCYANINES AND PHOTOSENSITIVE MATERIALS AND PRODUCTS RELATED THERETO
Laura K. Case, Winchester, Mass., assignor to Itek Corporation, Lexington, Mass.
No Drawing. Filed Mar. 16, 1967, Ser. No. 623,534
Int. Cl. G03c *1/00, 5/04, 5/24*
U.S. Cl. 96—27 45 Claims

ABSTRACT OF THE DISCLOSURE

This disclosure relates to an image reproduction system comprising a leucophthalocyanine and a photosensitive material, in which the photosensitive material becomes reversibly activated upon exposure to activating radiation but preferably remains essentially chemically unchanged after such exposure (hereinafter called a photoconductor). A leucophthalocyanine is a material which is known to the art to be capable of being reduced to a phthalocyanine dye. A negative image from an original is produced by either of two methods: (1) exposing a substrate comprising (a) a leucophthalocyanine and (b) a photoconductor, to an image pattern of activating radiation, and (2) exposing a photoconductor containing substrate to an image pattern of activating radiation and subsequently contacting said exposed substrate with a leucophthalocyanine. A positive photographic print is produced from an original with only one exposure by contacting the negative print of processes such as described above with a suitable receptive substrate. The leucophthalocyanine from the unexposed areas of the negative print is thereby transferred to the receptive substrate and then a positive image is developed on the receptive substrate. Acid catalysis is preferably used in the above-described processes to improve photographic speed. It has also been found that a very short exposure to one wavelength of activating radiation, e.g., ultraviolet light, will activate the photosensitive substrate comprising a leucophthalocyanine and a photoconductor so that the photosensitive substrate is now sensitive to different wavelengths of radiation to which the substrate is ordinarily not sensitive, e.g. visible light. Therefore, a very brief exposure of this photosensitive substrate to an image pattern of activating radiation may be followed by a flooding of such substrate to visible light to produce a visible image.

BACKGROUND OF THE INVENTION

(a) Field of the invention

This invention relates to the light sensitive compositions and processes of preparation thereof.

(b) Description of the prior art

Recently a number of processes for the production of photographic images by means of leucophthalocyanines have been disclosed. These leucophthalocyanines are essentially colorless as compared with the insoluble parent phthalocyanines (which have an intense blue to greenish-blue to green color). The leucophthalocyanines are barely colored (producing in solution a yellow-brown or reddish-brown color) and they have no tinctorial value. U.S. Pat. No. 2,884,326 discloses the negative process which results in a print of the parent phtholocyanine. This process utilizes a light sensitive substrate comprising a leucophthalocyanine and a diazonium compound. U.S. Pat. No. 2,915,392 discloses a similar negative process utilizing a light sensitive substrate comprising a leucophthalocyanine and oxalic acid, and an aliphatic alphahydroxycarboxylic acid, or a salt thereof. British Pat. No. 1,026,357 discloses a similar process utilizing a light sensitive substrate comprising a cobalt leucophthalocyanine, a polyamine and a ferric salt. The ferric salt is one which upon exposure to light will be converted to the ferrous state which can then reduce the leucophthalocyanine to the corresponding phthalocyanine dye. While these processes are able to produce negative prints which are renowned for their true blue color and their very good fastness to light and chemicals, they suffer from a number of disadvantages. The sensitiveness to light of the light sensitive substrates of the prior art processes is rather low, therefore necessitating long exposure periods. Process of British Pat. No. 1,026,357 requires the presence of a polyamine in the light sensitive substrate. Such polyamines add undesirable toxicity and a tendency to discolor in the final print. The addition of such polyamines also adds to the expense of the system. In addition the prior art processes are negative processes. Therefore, in order to get a positive, it is necessary to reexpose the negative print. Therefore, in order to get a positive image of an original it is necessary to go through a two-exposure process. This is time consuming, cumbersome, and expensive.

SUMMARY OF THE INVENTION

It has now been unexpectedly found that an image reproduction system having surprisingly favorable properties is formed from the combination of a leucophthalocyanine and a photoconductor (or photocatalyst). It has been unexpectedly found that when this image reproduction system is exposed to a pattern of activating radiation a phthalocyanine pigment image is formed.

A negative image from an original is produced by (1) exposing a substrate comprising (a) a leucophthalocyanine and (b) a photoconductor, to an image pattern of activating radiation, or by (2) exposing a photoconductor containing substrate to an image pattern of activating radiation and subsequently contacting said exposed substrate with a leucophthalocyanine. It has further been unexpectedly found that a positive phthalocyanine pigment print may be made in a one-exposure process by (1) preparing a negative phthalocyanine pigment print as by the process of this invention or by a prior art process, and (2) contacting said phthalocyanine pigment print with a leucophthalocyanine receptive sheet, thereby transferring to the receptive sheet the leucophthalocyanine from the unexposed areas of the negative print. The receptive sheet is then developed by heating, contacting with a reducing agent, or exposing to light or by other techniques known to the art. A preferred leucophthalocyanine receptive sheet is one comprising a photoconductor. More preferably, the photoconductor substrate receptor sheet is coated with a solvent for the particular leucophthalocyanine desired to be transferred.

Acid catalysis is preferably used in the above-described processes to improve photographic speed and/or to obtain a final image of increased optical density for a given exposure. The acid catalyzes the conversion of leucophthalocyanine to a phthalocyanine dye and therefore the acid catalyst may be added at any stage of the process desired: to the photoconductor substrate, to the leucophthalocyanine, or to the substrate containing both leucophthalocyanine and photoconductor.

It has an unexpectedly found that a very short exposure to one wavelength of activating radiation such as ultraviolet light will activate the photosensitive substrate comprising a leucophthalocyanine and a photoconductor so that the photosensitive substrate is now sensitive to wavelengths of radiation to which the substrate is ordinarily not sensitive, such as red visible light. Therefore it is possible to record an image pattern of radiation by a process comprising exposing a substrate comprising a leucophthalocyanine and a photoconductor to a very short exposure of an image pattern of activating radiation in order to form a latent image. This latent image may be invisible or only slightly visible. A visible image of good optical density is subsequently formed, for example, when desired by exposing at least the portions which have been previously exposed to activating radiation to additional radiation in the visible spectrum. Preferably the visible image of good optical density is obtained by a uniform exposure of the initially exposed substrate to a pattern of activating radiation such as visible light.

When a negative print is first obtained it contains unreduced leucophthalocyanine in the unexposed areas of the print. Therefore, when the print is to be observed in an environment containing activating radiation, the print should be inactivated in these non-image areas. This is preferably done by removing the leucophthalocyanine from the substrate by means of a suitable solvent.

DESCRIPTION OF PREFERRED EMBODIMENTS

The photoconductor or photocatalyst is not limited to any group of compounds but may include both organic and inorganic photosensitive materials. Preferred photoconductors useful in this invention are metal containing photoconductors. A preferred group of such photosensitive materials are the inorganic materials such as compounds of a metal and a non-metallic element of group VIA of the Periodic Table* such as metal oxides, such as zinc oxide, titanium dioxide, antimony trioxide, aluminum oxide, zirconium dioxide, germanium dioxide, indium trioxide, hydrated potassium aluminum silicate $$(K_2Al_6Si_6O_{22}\cdot 2H_2O)$$

tin oxide ($SnO_2$), bismuth oxide ($Bi_2O_3$), lead oxide ($PbO$), beryllium oxide ($BeO$), silicon dioxide ($SiO_2$), barium titanate ($BaTiO_3$), tantalum oxide ($Ta_2O_5$), tellurium oxide ($TeO_2$), and boron oxide ($B_2O_3$); metal sulfides such as cadium sulfide ($CdS$), zinc sulfide ($ZnS$) and tin disulfide ($SnS_2$); metal selenides such as cadmium selenide ($CdSe$). Metal oxides are especially preferred photoconductors of this group. Titanium dioxide is a preferred metal oxide because of its unexpectedly good results.

Also useful in this invention as photoconductors are certain fluorescent materials. Such materials include, for example, compounds such as silver activated zinc sulfide, zinc activated zinc oxide, manganese activated zinc phosphate $Zn_3(PO_4)_2$, an admixture of copper sulfide, antimony sulfide ($SbS$) and magnesium oxide ($MgO$), and cadmium borate.

Photochromic materials, such as the photochromic metal organic complexes, are also useful as photocatalysts in this invention. Such materials include as photochromic complexes such as:

(1) $[Co(C_2H_4N_2H_4)_3]_2(S_2O_8)_3$
(2) $[Co(C_2H_4N_2H_4)_3]_2(C_2O_4)_3$
(3) $[Co(NH_3)_6]_2(SO_4)_2S_2O_8$
(4) $[Co(NH_3)_6]_2(C_2O_4)_3$
(5) $K_3[Fe(C_2O_4)_3]$
(6) $K_3[Mn(C_2O_4)_3]$
(7) $[Cr(C_2H_4N_2H_4)_3]_2(SO_4)_2S_2O_8$

In place of the ethylenediamine ($C_2H_4N_2H_4$) and ammonia of the above compounds, such coordinating groups as guanidine, azido and nitrito may be used. Other reducible anions which may be used in place of the above compounds include tetrathionate, selenate and perchlorate.

Other organic photoconductors suitable for use in this invention are, for example, the imidazolidinones, the imidazolidinethiones, the tetraarylazacyclooctatetraenes, and thiazines, such as 1,3-diphenyl-4,5-bis(p-methoxyphenyl)imidazolidinone-2; 4,5-bis(para-methoxyphenyl) imidazolidinone - 2; 4 - phenyl-5-(paradimethylaminophenyl)imidazolidinone-2; 4,5-bis(para-methoxyphenyl) imidazolidenthione - 2; 3,4,7,8 - tetraphenyl-1,2,5,6-tetraazacyclooctatetraene-2,4,6,8; and methylene blue.

Also useful as photoconductors in this invention are the heteropolyacids such as phosphotungstic acid, phosphosilicic acid, and phosphomolybdic acid.

While the exact mechanism by which this invention works is not known, it is believed that exposure of photoconductors or photocatalysts of this invention to activating means causes an electron or electrons to be transferred from the valence band of the photoconductor or photocatalyst to the conductance band of the same or at least to some similar excited state whereby the electron is loosely held, thereby changing the photoconductor from an inactive form to an active form. If the active form of the photoconductor or photocatalyst is in the presence of an electron accepting compound a transfer of electrons will take place between the photoconductor and the electron accepting compound thereby reducing the electron accepting compound. Therefore a simple test which may be used to determine whether or not materials have a photoconductor or photocatalytic effect is to mix the material in question with an aqueous solution of silver nitrate. Little, if any, reaction should take place in the absence of light. The mixture is then subjected to light. At the same time that a control sample of an aqueous solution of silver nitrate alone is subjected to light, such as ultraviolet light. If the mixture darkens faster than the silver nitrate alone, the material is a photoconductor or photocatalyst.

It is evident that the gap between the valence and the conducting band of a compound determines the energy needed to make electron transitions. The more energy needed, the higher the frequency to which the photoconductor will respond. It is known to the art that it is possible to reduce the band-gap for these compounds by adding a foreign compound as an activator which either by virtue of its atomic dimensions or by possessing a particular electronic forbidden zone structure or through the presence of traps as donor levels in the intermediate zone between the valence and the conduction band stresses the electronic configuration of the photoconductive compound, thereby reducing its band-gap and thus increasing its ability to release electrons to its conduction band. Phosphors almost necessarily imply the presence of such activating substances. The effect of such impurities may be such as to confer photoconductivity upon a compound which intrinsincally is non-photoconductive. The (Ca-Sr)S phosphors are believed to be an example of this group. On the other hand, excessive impurity content can interfere with a compound acting as a photoconductor, as above described.

The leucophthalocyanine complexes useful in this invention are those such as described in U.S. Pat. No. 2,915,-392, herein incorporated by reference. The preferred leucophthalocyanine complexes useful in this invention are the solvent-soluble phthalocyanine complexes taken from the group consisting of (a) such a complex an empirical formula $M(C_8H_4N_2)_6NH$ in which each of the six $C_8H_4N_2$ groups represents one phthalonitrile unit, four of which are joined to the central divalent metal M taken from the group consisting of Ca, Cu, Co, and Ni and form a metal phthalocyanine molecule, the two extra phthalonitrile units and the extra NH group representing a wing $(C_8H_4N_2)_2NH$, said complex being further characterized by yielding the corresponding metal phthalocyanine, a phthalonitrile and ammonia upon being treated with chemical reducing agents, (b) such a complex represented by the formula:

$$MPc\begin{matrix}\diagup (OR)_n\\ \diagdown X_n\end{matrix}$$

* Periodic Table from Lange's "Handbook of Chemistry," 9th edition, pp. 56–57, 1956.

wherein M is a divalent metal taken from the group consisting of Ca, Cu, Co and Ni, Pc is a phthalocyanine, R is an alkyl radical, X is a halogen taken from the group consisting of chlorine and bromine and *n* is a positive integer from 1 to 4 inclusive, (c) such a complex of the formula

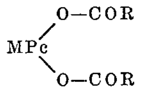

wherein M is a divalent metal taken from the group consisting of Co, Cr, Fe, Mg, Cu and Ni, Pc is a phthalocyanine molecule and —COR is the acyl radical of an organic carboxylic acid of 2 through 7 carbon atoms, and (d) the corresponding metal-free complexes of the complexes (a), (b) and (c) wherein the metal M is replaced by two hydrogen atoms.

Irradiation sources which are useful in this invention include ultraviolet light which is one of the best radiant sources. Incandescent light is a fair source of ultraviolet light. Fluorescent light is a better source of ultraviolet light. The photocatalysts of this invention are not usually sensitive to the entire actinic light range. However, by doping with foreign ions and coating with dye sensitizers such as eosin, uranine, and erythrosyn, the photocatalysts of this invention can be made sensitive to various wavelengths of light or other radiant energy. Radiation by X-rays or gamma rays is also effective in exciting the photocatalysts. Beams of electrons and other like particles may also be used in the place of the ordinary forms of radiation for forming an image according to this invention.

The inert carrier sheet upon which the leucophthalocyanine and photoconductor are deposited comprises any suitable backing of sufficient strength and durability to satisfactorily serve as a reproduction carrier. The carrier sheet may be in any form such as, for example, sheets, ribbons, rolls, etc. This sheet may be made of any suitable materials such as wood, rag content paper, pulp paper, plastics such as, for example, polyethylene terephthalate (Mylar) and cellulose-acetate, cloth, metallic foil and glass. The preferred form of the carrier sheet is a thin sheet which is flexible and durable.

It is also useful to use a binder agent to bind the leucophthalocyanine and semiconductor or photocatalyst material to the carrier sheet. In general, these binders are translucent or transparent so as not to interfere with transmission of light therethrough. Preferred binder materials are organic materials such as resins. Examples of suitable resins are butadiene-styrene copolymer, poly(alkyl acrylates) such as poly-(methyl methacrylate), polyamides, polvinyl acetate, polyvinyl alcohol and polyvinylprrolidone.

Examples of acidic materials which are useful in catalyzing the reduction of a leucophthalocyanine to a phthalocyanine dye are, for example, hydrogen-containing acids. Preferred acidic materials are the organic acids such as acetic acid, benzoic acid and oxalic acid. Lewis acids such as zinc chloride, stannous chloride, ferrous chloride and the like may be used. These Lewis acids, however, are preferably not materials containing a reducible metal ion which will be preferentially reduced over the particular leucophthalocyanine complex used in the particular system. Also useful for the acid materials useful in this invention are compounds which form acids when exposed to light, e.g. carbon tetrabromide ($CBr_4$), boroxines, alphahaloketones, alkylphosphonic acid halides, and orthonitrobenzaldehyde.

The photoconductor should be conditioned in the dark before exposure when the catalyst is sensitive to actinic light. Such conditioning is generally conducted from one to twenty-four hours. After conditioning, the photoconductor is not exposed to light prior to its exposure to activating radiation for recording an image pattern.

To remove the leucophthalocyanine complex from the unexposed areas, any suitable solvent may be used. Organic solvents such as alcohols, e.g. ethanol and methanol; hydrocarbons, e.g. benzene and toluene; ethers, e.g. ethylether, dioxane and tetrahydrofuran; ketones, e.g. acetone and methyl ethyl ketone, are especially suitable since leucophthalocyanine compounds are readily soluble in these solvents and the phthalocyanine dye is very insoluble therein.

The period of exposure will depend upon the intensity of the light source, the particular leucophthalocyanine, particular photoconductor, the type and amount of catalyst, if any, and like factors known to the art. In general, however, the exposure may vary from about .01 second to several minutes.

Suitable reducing agents for the leucophthalocyanine compounds are, for example, the chemical reducing agents such as the dihydroxybenzene compounds such as hydroquinone, the diamine compounds such as paraphenylenediamine, the aminophenol compounds such as Metol (p-methylaminophenol), hydrosulfite compounds such as sodium hydrosulfite, phenylpyrazolidones such as phenidone, acids such as ascorbic acid, other nitrogen containing reducing agents such as hydrazine and lower valent inorganic salt reducing agents such as stannous chloride ($SnCl_2$). One skilled in the art will be aware of other suitable reducing means for converting a leucophthalocyanine to its corresponding phthalocyanine dye.

EXAMPLE 1

A single-weight baryta paper substrate coated with titanium dioxide in an acrylate binder is immersed in a saturated methanolic solution of copper leucophthalocyanine. The thus-treated substrate is air dried at room temperature and cut into several strips. One of these strips is then exposed to an image pattern of activating radiation from a 6-watt fluorescent light source (source of near-ultarviolet light) for a period of 60 seconds. A deep blue negative image with a reflectance optical density of 0.81 in the 600–625 mμ region is obtained. Similar exposures of similar samples for periods of 30, 10 and 5 seconds yield blue images with optical densities of 0.68, 0.46 and 0.34 respectively. The image is fixed by rinsing in methanol. Filter paper is impregnated with the same copper leucophthalocyanine solution to yield an image of optical density of 0.1, when similarly exposed for 60 seconds to the above-described light source.

EXAMPLE 2

A single-weight baryta paper bearing a titanium dioxide acrylate binder coating is exposed for 60 seconds to an image pattern of activating radiation from a 6-watt fluorescent light source (source of near-ultraviolet light) and then subsequently immersed in a saturated methanolic solution of copper leucophthalocyanine. A visible blue image of optical density 0.25 results.

EXAMPLE 3

A titanium dioxide coated paper is impregnated with a saturated tetrahydrofuran solution of copper leucophthalocyanine and exposed to an image pattern of activating radiation from a mercury arc lamp for 60 seconds. The exposed negative image-bearing layer is then brought in intimate contact for about 30 seconds with a titanium dioxide coated receptor sheet moistened with methanol. The two papers are separated. The receptor sheet is cut into three parts. One part of the receptor sheet is developed by uniformly exposing with a Sylvania sungun lamp (light source having wavelengths similar to ordinary sunlight). A positive print of deep blue color is obtained. The second part of the receptor sheet is developed by heating for about 5 minutes at room temperature of approximately 75–85° C. A positive blue image is obtained. The third part of the receptor sheet is developed by contacting with an aqueous solution of sodium sulfite. A positive blue image is obtained. Aqueous solutions of hydrazine or stannous chloride ($SnCl_2$) are substituted for the sodium sulfite with equally good results.

EXAMPLE 4

Filter paper is saturated with a 10% tetrahydrofuran solution of 1,3 - diphenyl-4,5-bis(p-methoxyphenyl)imidazolidinone-2 and dried. The dried filter paper is impregnated with a saturated alcoholic solution of copper leucophthalocyanine and dried. The paper is then exposed imagewise to a 6-watt fluorescent light source (source of near-ultraviolet light) for 30 seconds. A blue print is obtained which is fixed by rinsing in alcohol.

EXAMPLE 5

A titanium dioxide coated single weight baryta paper impregnated with copper leucophthalocyanine is treated with dilute acetic acid. Three samples of this thus-treated paper is then exposed imagewise to a UV light source for one, five and thirty seconds respectively. Blue print out images of optical density 0.320, 0.496 and 0.660 were obtained, respectively. In a control experiment conducted in a manner similar to that just described except that the acid treatment is omitted, optical densities of 0.180, 0.200, and 0.502 are obtained, respectively.

A titanium dioxide coated single weight baryta paper impregnated with copper leucophthalocyanine is treated with a 5% methanolic solution of $ZnCl_2$ and then exposed for 30 seconds. A deep blue negative print of optical density 0.97 is formed.

EXAMPLE 6

A titanium dioxide coated paper is impregnated with a methanolic solution of copper leucophthalocyanine and exposed for five seconds to an image pattern of ultraviolet light, rinsed with methanol and dried. A blue print-out image of optical density 0.21 is obtained. An identical sample of paper as that just described is not rinsed in methanol immediately after the ultraviolet exposure but instead is subjected to a thirty-second exposure of light of wavelength longer than 510 m$\mu$. It is then rinsed with methanol and dried. The optical density of this second blue print-out image had increased to 0.37. A thirty-second exposure of a third sample having the same composition as the first two samples to light of wavelength in excess of 510 m$\mu$ without prior ultraviolet exposure did not yield a discernible print-out image.

EXAMPLE 7

Single-weight baryta paper bearing a zinc oxide coating in an organic binder is impregnated with a saturated ethanolic solution of copper leucophthalocyanine and exposed to an image pattern of ultraviolet light for three minutes. A blue copper phthalocyanine dye print-out image is obtained.

EXAMPLE 8

A titanium dioxide coated paper is impregnated with a saturated tetrahydrofuran solution of nickel leucophthalocyanine and dried. An imaging exposure of sixty seconds to a 6-watt fluorescent light source (source of near-ultraviolet light) yields a blue-green image of optical density of 0.40. Treatment of an identical sample prior to exposure with dilute acetic acid increased the print-out density to 0.48.

EXAMPLE 9

A titanium dioxide coated paper is impregnated with a saturated alcoholic solution of copper leucophthalocyanine and exposed directly to an X-ray beam of 50 kv. for sixty seconds using a platinum target. A blue print-out image of optical density 0.64 is obtained.

EXAMPLE 10

A titanium dioxide coated single-weight baryta paper is impregnated with a saturated methanolic solution of Phthalogen Blue IB (a cobalt leucophthalocyanine), dried and exposed for 30 seconds to a near ultraviolet light source. A blue print-out image of optical density 0.32 is obtained.

EXAMPLE 11

Filter paper is impregnated with a saturated solution of phosphosilicic acid in methanol and subsequently with a solution of copper leucophthalocyanine and exposed for 15 seconds to a near ultraviolet light source. A blue negative print is obtained.

The invention claimed is:

1. An image reproduction system comprising (1) a leucophthalocyanine metal complex which is reducible to a phthalocyanine dye upon intimate contact with an activated photoconductor, which photoconductor when contacted with silver nitrate solution and exposed to activating light causes a darkening of the solution, and (2) a radiation activatable photoconductor as above described.

2. An image reproduction system comprising: (1) a solvent-soluble phthalocyanine complex taken from the group consisting of (a) such a complex having the empirical formula $M(C_8H_4N_2)_6NH$ in which each of the six $C_8H_4N_2$ groups represents one phthalonitrile unit, four of which are joined to the central bivalent metal M taken from the group consisting of Cu and Ni and form a metal phthalocyanine molecule, the two extra phthalonitrile units and the extra NH group representing a wing $(C_8H_4N_2)_2NH$, said complex being further characterized by yielding the corresponding metal phthalocyanine, a phthalonitrile and ammonia upon being treated with reducing agents, (b) such a complex represented by the formula:

$$\mathrm{MPc}\genfrac{}{}{0pt}{}{\diagup(\mathrm{OR})_n}{\diagdown \mathrm{X}_n}$$

wherein M is a divalent metal taken from the group consisting of Cu and Ni, Pc is a phthalocyanine molecule, R is an alkyl radical, X is a halogen taken from the group consisting of chlorine and bromine and *n* is a positive integer from 1 to 4 inclusive, (c) such a complex of the formula $$\mathrm{MPc}\genfrac{}{}{0pt}{}{\diagup \mathrm{O{-}COR}}{\diagdown \mathrm{O{-}COR}}$$

wherein M is a divalent metal taken from the group consisting of Cu and Ni, Pc is a phthalocyanine molecule and —COR is the acyl radical of an organic carboxylic acid of 2 through 7 carbon atoms, and (d) the corresponding metal-free complexes of the complexes (a), (b) and (c) wherein the metal M is replaced by two hydrogen atoms, and (2) a photosensitive photoconductor material which photoconductor material when contacted with silver nitrate solution and exposed to activating light causes a darkening of the solution.

3. A radiation-sensitive sheet which comprises an inert carrier sheet containing (1) a solvent-soluble phthalocyanine complex having an empirical formula $$M(C_8H_4N_2)_6NH$$

in which each of the six $C_8H_4N_2$ groups represents one phthalonitrile unit, four of which are joined to the central bivalent metal M taken from the group consisting of Cu and Ni and form a metal phthalocyanine molecule, the two extra phthalonitrile units and the extra NH group representing a wing $(C_8H_4N_2)_2NH$, said complex being further characterized by yielding the corresponding metal phthalocyanine, a phthalonitrile and ammonia upon being treated with reducing agents, (b) such a complex represented by the formula:

$$\mathrm{MPc}\genfrac{}{}{0pt}{}{\diagup(\mathrm{OR})_n}{\diagdown \mathrm{X}_n}$$

wherein M is a divalent metal taken from the group consisting of Cu and Ni, Pc is a phthalocyanine, R is an alkyl radical, X is a halogen taken from the group consisting of chlorine and bromine and $n$ is a positive integer from 1 to 4 inclusive, (c) such a complex of the formula $$MPc\begin{matrix} \diagup O-COR \\ \diagdown O-COR \end{matrix}$$

wherein M is a divalent metal taken from the group consisting of Cu and Ni, Pc is a phthalocyanine molecule and —COR is the acyl radical of an organic carboxylic acid of 2 through 7 carbon atoms, and (d) the corresponding metal-free complexes of the complexes (a), (b) and (c) wherein the metal M is replaced by two hydrogen atoms, and (2) a metal containing photosensitive material which is activated into the transfer of electrons by activating radiation.

4. A radiation-sensitive sheet in claim 2 which comprises an acidic catalyst.

5. A radiation-sensitive sheet as in claim 2 wherein metal containing photosensitive material is at least one member from the group consisting of organometallic compounds, compounds of a metal element with a nonmetallic element of Group VI–A of the Periodic Table, fluorescent materials, photochromic metal organic complexes, lead chromate, lead molybdate, and a heteropoly acid.

6. A radiation-sensitive sheet as in claim 3 wherein the metal containing photosensitive material is at least one member selected from the group consisting of (1) a metal oxide, (2) metal sulfide and (3) a metal selenide.

7. A radiation-sensitive sheet which comprises an inert carrier sheet containing uniformly bonded over the surface thereof (1) a cyclotetra-isoindolenine-(endo-isoindolenino)-copper complex and (2) a photosensitive material selected from at least one member of the group consisting of zinc oxide, titanium dioxide, antimony trioxide, aluminum oxide, cadmium sulfide, cadmium selenide, gallium nitride, lead chromate and lead molybdate.

8. A radiation-sensitive sheet as in claim 7 wherein said photosensitive material is zinc oxide.

9. A radiation-sensitive sheet as in claim 7 wherein said photosensitive material is titanium dioxide.

10. A radiation-sensitive sheet as in claim 5 wherein said photosensitive material is phosphosilicic acid.

11. A radiation-sensitive sheet as in claim 3 wherein said photosensitive material has been doped with foreign ions or dye sensitized to increase the spectral sensitivity of the semiconductor.

12. A visible image bearing element comprising (1) a phthalocyanine dye image and (2) a photosensitive photoconductor material, which photoconductor when contacted with silver nitrate solution and exposed to activating light causes a darkening of the solution, which image bearing element is formed by exposing the image reproduction system of claim 1 to activating radiation.

13. A visible image bearing element comprising (1) a phthalocyanine dye and (2) a photosensitive material which is formed by exposing the image reproduction system of claim 7 to at least one radiation wavelength below one micron.

14. The product of claim 12 which has been fixed by washing with a solvent for said solvent-soluble phthalocyanine complex.

15. The product of claim 14 which has been fixed by washing with lower aliphatic alcohol.

16. A process comprising exposing the image reproduction system of claim 1 to a pattern of activating radiation to produce an image.

17. A process comprising exposing the radiation-sensitive sheet of claim 2 to a pattern of activating radiation.

18. A process as in claim 17 wherein an acid catalyst is used with the radiation-sensitive sheet to accelerate the process.

19. A process comprising exposing the radiation-sensitive sheet of claim 4 to a pattern of activating radiation.

20. A process as in claim 17 comprising the additional step of removing the phthalocyanine complex which remains on the reproduction system by means of a solvent therefore.

21. A process as set forth in claim 20 wherein said solvent is an organic solvent.

22. A process as in claim 21 wherein said solvent is a lower aliphatic alcohol.

23 A process which comprises the step of exposing to a pattern of activating radiation a radiation-sensitive sheet which comprises (1) a leucophthalocyanine metal complex capable of being reduced to a phthalocyanine dye by contact with an activated photosensitive material which has been exposed to activating radiation and (2) a photosensitive material having reducing power when exposed to activating radiation, to form a latent image and thereby sensitizing the radiation-sensitive sheet in the radiation-struck areas to "additional different wavelengths" of radiation to which the radiation-sensitive sheet was not previously sensitive and then intensifying the image thus formed by the additional step of exposing at least the image portions of the radiation-sensitive sheet to activating radiation from said "additional different wavelengths" range.

24. A process comprising exposing the image reproduction system of claim 1 to a pattern of activating radiation in the ultraviolet range to produce an image and then intensifying the image by the additional step of exposing at least the image portions of the image reproduction system to activating radiation in the visible light range.

25. A process which comprises exposing the radiation-sensitive sheet of claim 7 to a pattern of activating radiation in the ultraviolet range to form an image and then intensifying the image thus formed by the additional step of exposing at least the image portions of the radiation-sensitive sheet to activating radiation in the visible range.

26. A process which comprises recording an image pattern comprising contacting a first radiation-sensitive sheet which comprises (1) a leucophthalocyanine complex capable of being reduced to a phthalocyanine dye and (2) a photosensitive material having reducing power when exposed to activating radiation with a leucophthalocyanine-receptive sheet and then developing at least portions of the leucophthalocyanine-receptive sheet to form a phthalocyanine dye image.

27. A process which comprises exposing an image reproduction system of claim 2 to a pattern of activating radiation, contacting the image reproduction system thus exposed with a leucophthalocyanine receptive radiation-sensitive sheet comprising a photosensitive material having reducing power when exposed to activating radiation, to transfer to said radiation-sensitive sheet at least part of the leucophthalocyanine complex which remains on the image reproduction system after exposure, and then developing at least portions of the leucophthalocyanine-receptive radiation-sensitive sheet to form a phthalocyanine dye image.

28. A process which comprises the step of exposing a first radiation-sensitive sheet of claim 4 to a pattern of activating radiation, contacting the first radiation-sensitive sheet of the exposing step with a leucophthalocyanine-receptive radiation-sensitive sheet comprising a photosensitive material having reducing power when exposed to activating radiation, to transfer to said radiation-sensitive sheet at least part of the leucophthalocyanine complex which remains on the first radiation-sensitive sheet, and then developing at least portions of the leucophthalocyanine-receptive radiation-sensitive sheet to form a phthalocyanine dye image.

29. A process which comprises the steps of exposing a first radiation-sensitive sheet of claim 5 to a pattern of activating radiation, contacting the first radiation-sensitive sheet of the exposing step with a leucophthalocyanine-receptive radiation-sensitive sheet comprising a photosensitive material having reducing powder when exposed to activating radiation to transfer to said radiation-sensitive sheet at least part of the leucophthalocyanine complex which remains on the first radiation-sensitive sheet, and then developing at least portions of the leucophthalocyanine-receptive radiation-sensitive sheet to form a phthalocyanine dye image.

30. A process which comprises the step of exposing a first radiation-sensitive sheet of claim 7 to a pattern of activating radiation, contacting the first radiation-sensiitve sheet of the exposing step with a leucophthalocyanine-receptive radiation-sensitive sheet comprising a photosensitive material having reducing power when exposed to activating radiation to transfer to said radiation-sensitive sheet at least part of the leucophthalocyanine complex which remains on the first radiation-sensitive sheet, and then developing at least portions of the leucophthalocyanine-receptive radiation-sensitive sheet to form a phthalocyanine dye image.

31. A process which comprises the step of exposing a first radiation-sensitive sheet of claim 9 to a pattern of activating radiation, contacting the first radiation-sensitive sheet of the exposing step with a leucophthalocyanine-receptive radiation-sensitive sheet comprising a photosensitive material having reducing power when exposed to activating radiation to transfer to said radiation-sensitive sheet at least part of the leucophthalocyanine complex which remains on the first radiation-sensitive sheet, and then developing at least portions of the leucophthalocyanine-receptive radiation-sensitive sheet to form a phthalocyanine dye image.

32. A process as in claim 30 wherein said leucophthalocyanine-receptive radiation-sensitive sheet is a solvent saturated substrate.

33. A process as in claim 32 wherein said solvent is an alcohol.

34. A process as in claim 26 wherein said developing is carried out by applying heat.

35. A process as in claim 26 wherein said developing is carried out by exposing at least the image portions of said leucophthalocyanine-receptive sheet to activating radiation.

36. A process as in claim 26 wherein said reducing step is carried out by means of a chemical reducing agent.

37. A process as in claim 36 wherein said reducing agent is at least one member selected from the group consisting of a dihydroxybenzene compound, a diamine compound, an aminophenol compound, a hydrosulfite compound, a phenylpyrazolidone compound, an acid compound, and a nitrogen containing compound.

38. A process as in claim 36 wherein said reducing agent is metol.

39. A process comprising the step of exposing to a pattern of activating radiation an image reproduction system comprising a photosensitive photoconductor material, which photoconductor when contacted with silver nitrate solution and exposed to activating light causes a darkening of the solution, and then developing activated portions of said system by contacting at least said portions with a leucophthalocyanine complex capable of being reduced to a phthalocyanine dye when contacted with said photosensitive photoconductor material which has been exposed to activating radiation.

40. A process as in claim 39 wherein the leucophthalocyanine complex is a solvent-soluble phthalocyanine complex taken from the group consisting of (a) such a complex having an empirical formula $M(C_8H_2)_6NH$ in which each of the six $C_8H_4N_2$ groups represents one phthalonitrile unit, four of which are joined to the central bivalent metal M taken from the group consisting of Cu and Ni and form a metal phthalocyanine molecule, the two extra phthalonitrile units and the extra NH group representing a wing $(C_8H_4N_2)_2NH$, said complex being further characterized by yielding the corresponding metal phthalocyanine, a phthalonitrile and ammonia upon being treated with reducing agents, (b) such a complex represented by the formula:

$$MPc\begin{cases}(OR)_n \\ X_n\end{cases}$$

wherein M is a divalent metal taken from the group consisting of Cu and Ni, Pc is a phthalocyanine, R is an alkyl radical, X is a halogen taken from the group consisting of chlorine and bromine and $n$ is a positive integer from 1 to 4 inclusive, (c) such a complex of the formula:

$$MPc\begin{cases}O{-}COR \\ O{-}COR\end{cases}$$

wherein M is a divalent metal taken from the group consisting of Cu and Ni, Pc is a phthalocyanine molecule and —COR is the acyl radical of an organic carboxylic acid of 2 through 7 carbon atoms, and (d) the corresponding metal-free complexes of the complexes (a), (b) and (c) wherein the metal M is replaced by two hydrogen atoms.

41. A process as in claim 40 wherein the process is conducted in the presence of an "acidic catalyst."

42. A process as in claim 39 wherein said photosensitive material is metal containing compound.

43. A process as in claim 40 wherein said metal containing compound is at least one photosensitive material selected from the group consisting of compounds of a metal and a nonmetallic element of Group IV–A of the Periodic Table, fluorescent materials, heteropoly acids, photochromic metal organic complexes, other metal containing compounds such as gallium nitride, lead chromate, and lead molybdate.

44. A process comprising exposing to an image pattern of activating radiation a radiation-sensitive sheet which comprises a photosensitive material selected from at least one member of the group consisting of zinc oxide, titanium dioxide, antimony trioxide, aluminum oxide, cadmium sulfide, cadmium selenide, gallium nitride, lead chromate, phosphosilicic acid and lead molybdate and then developing activated portions of said radiation-sensitive sheet by contacting at least said portions with a cyclotetra - isoindolenine-(endo - isoindolenino)-copper complex.

45. The developed product of claim 39.

References Cited

UNITED STATES PATENTS

| | | | |
|---|---|---|---|
| 2,884,326 | 4/1959 | Zemp et al. | 96—90 X |
| 2,915,392 | 12/1959 | Pendersen et al. | 96—90 X |
| 3,152,903 | 10/1964 | Shepard et al. | 96—64 |
| 3,360,367 | 3/1966 | Stricklin | 96—27 X |
| 3,380,823 | 4/1968 | Gold | 96—27 |

NORMAN G. TORCHIN, Primary Examiner

R. E. FICHTER, Assistant Examiner

U.S. Cl. X.R.

96—48, 88